United States Patent
Mullins

[19]

[11] Patent Number: 6,017,003
[45] Date of Patent: Jan. 25, 2000

[54] SATELLITE OPERATING SYSTEM AND METHOD

[75] Inventor: Dennis Roy Mullins, London, United Kingdom

[73] Assignee: ICO Services Ltd, London, United Kingdom

[21] Appl. No.: 08/990,136

[22] Filed: Dec. 12, 1997

[30] Foreign Application Priority Data

Dec. 12, 1996 [GB] United Kingdom .................. 9625870

[51] Int. Cl.[7] .............................. B64G 1/44; G01S 1/00
[52] U.S. Cl. ........................................ 244/173; 342/350
[58] Field of Search ................................ 244/172, 173; 342/350, 354

[56] References Cited

U.S. PATENT DOCUMENTS

| | | | |
|---|---|---|---|
| 4,384,692 | 5/1983 | Preukschat . | |
| 4,732,354 | 3/1988 | Lievre . | |
| 5,067,672 | 11/1991 | Bouzat . | |
| 5,098,041 | 3/1992 | Uetrecht | 244/172 |
| 5,149,022 | 9/1992 | Flament . | |
| 5,175,556 | 12/1992 | Berkowitz . | |
| 5,411,227 | 5/1995 | Basuthakur et al. . | |
| 5,621,415 | 4/1997 | Tuck | 342/354 |
| 5,687,933 | 11/1997 | Goodzeit et al. | 244/172 |
| 5,739,784 | 4/1998 | Jan et al. | 342/354 |
| 5,758,260 | 5/1998 | Wiedeman | 342/354 |
| 5,790,070 | 8/1998 | Natarajan et al. | 342/354 |
| 5,791,598 | 8/1998 | Rodden et al. | 244/165 |

FOREIGN PATENT DOCUMENTS

| | | |
|---|---|---|
| 0260442 A2 | 3/1988 | European Pat. Off. . |
| 0435708 | 7/1991 | European Pat. Off. . |
| 0544198 | 6/1993 | European Pat. Off. . |
| 0603869 | 6/1994 | European Pat. Off. . |
| 0785132 A1 | 7/1997 | European Pat. Off. . |
| 2746365 A1 | 9/1997 | France . |
| 4440658 A1 | 5/1996 | Germany . |
| 2282114 | 3/1995 | United Kingdom . |

*Primary Examiner*—Peter M. Poon
*Assistant Examiner*—Charles R. Ducker, Jr.
*Attorney, Agent, or Firm*—McDermott, Will & Emery

[57] ABSTRACT

A satellite system and method comprises a satellite 10 induced to roll 46 and pitch 52 in its orbit 12 to keep antennae 34 36 pointing ever directly at the nadir 40 as the nadir moves over the surface of the earth 14. The satellite 10 has a yaw rotation 54 designed to keep the solar panels, which rotate only about one axis, ever pointing at ninety degrees to the direction of the sun 42 for maximum solar panel efficiency. The beam pattern of the antennae 34 36 is counter-rotated to oppose the yaw motion 54. Compensation for the season of the year is applied.

17 Claims, 10 Drawing Sheets

SATELLITE OPERATING SYSTEM AND METHOD

The present invention relates to satellites in orbit about the earth. Most particularly it relates to satellites used with one face thereof pointing constantly at the earth, such as a communications or surveillance satellite. In greatest particularity, the present invention relates to such satellites where power is derived from solar panels.

A satellite, set in orbit about the earth, and providing some service relating to the surface of the earth, such as communications, surveying or surveillance, is required always to point its communications surveying or surveillance, or other apparatus towards the surface of the earth.

Satellites derive their power from various sources. It is known to use storage batteries and nuclear power sources. The former are of finite life. The latter are expensive, dangerous to construct and potentially contaminative on re-entry into the earth's atmosphere. By far the most popular source of power or satellites is an array of solar panels which directly convert energy from sun light into electrical power capable of maintaining the function of a satellite.

In orbit about the earth, the satellite periodically is obscured by the earth's shadow. During these times, the satellite relies upon stored electrical energy for it's power. For efficient operation of the satellite, the position solar panels, which operate with best efficiency when in sunlight, so that, when the sun is obscured, the satellite will have received the maximum allowed charge so the satellite can have maximum endurance when obscured from the sun.

The present invention seeks to provide a satellite system and associated method whereby the optimal use of the solar panels is achieved.

It is customary, when constructing a satellite with solar panels, to arrange that the solar panels are rotatable, on more than one axis, so that the solar panels may always be pointed towards the sun, when the sun is in view. Each means for rotating the solar panels about an axis involves equipment which adds to the weight of the satellite. In addition, devices such as slip rings and flexible couplings, to maintain the electrical connection between the solar panels and the satellite, are prone to unreliability and mechanical failure which it is impossible to repair once a satellite has been placed in orbit. It is a particular problem with communications satellites, where an antenna array must be kept pointing, always, towards the surface of the earth. In general terms, in the prior art, if the solar panel rotation equipment is minimized, the body of the satellite must swing relative to the surface of the earth, which, intern, requires mechanical means for orienting the antenna array. It is desirable to provide a method and system where in the body of the satellite need not deviate from having fixed antenna arrays pointing always at the surface of the earth, at the same time minimizing the amount of rotation required of the solar panels.

According to a first aspect, the present invention consists in a satellite system comprising a satellite in substantially circular orbit about the earth, said satellite being constrained to present a first face towards its nadir at all points in said orbit, said satellite comprising a solar panel, operative to rotate about an axis to face the sun, said satellite being characterised by executing a yaw rotation about the direction between said satellite and said nadir, as said satellite executes said orbit, said yaw rotation being operative ever to present said axis at ninety degrees to the direction between said satellite and the sun, thereby to enable said solar panel to obtain maximum exposure to energy from the sun.

The first aspect of the invention further provides a system, wherein the first face comprises a communication antenna for providing a predetermined field pattern on the surface of the earth, and electronic means for imparting a counter-rotation to said field pattern, about said direction between said satellite and said nadir, to counteract the movement of said field pattern resulting from said yaw rotation.

The first aspect of the invention further comprises a system, wherein the antenna comprises a plurality of individual antenna elements, and signal phasing means operative to adjust the relative phase of each of said antenna elements to create the field pattern and to impart counter-rotation to the field pattern.

The first aspect of the invention yet further provides a system wherein the counter-rotation of the field pattern comprises rotating the field pattern, relative to said satellite, by substantially 360 degrees for each orbit of the satellite.

The first aspect of the invention yet further provides a system wherein the field pattern comprises a plurality of spot beams.

The first aspect of the invention further provides a system for use in telephonic communications with user terminals on the surface of the earth.

The first aspect of the invention yet further provides a system including means to adjust the yaw rotation to compensate for the season of the year.

The first aspect of the invention further provides a system wherein the electronic means is operative to adjust the counter-rotation in sympathy with the adjustment of the yaw rotation for the season of the year.

According to a second aspect, the present invention consists in a method for operating a satellite system, said system comprising a satellite in substantially circular orbit about the earth, where said satellite is constrained to present a first face towards its nadir at all points in said orbit, and where said satellite comprises a solar panel, operative to rotate about an axis to face the sun, said method including the step of causing said satellite to execute a yaw rotation about the direction between said satellite and said nadir, as said satellite executes said orbit, said yaw rotation being operative ever to present said axis at ninety degrees to the direction between said satellite and the sun, thereby to enable said solar panel to obtain maximum exposure to energy from the sun.

The second aspect of the invention further provides a method, for use wherein the first face comprises a communication antenna for providing a predetermined field pattern on the surface of the earth, including the step of employing electronic means for imparting a counter-rotation to the field pattern, about the direction between the satellite and the nadir, to counteract the movement of the field pattern resulting from the yaw rotation.

The second aspect of the invention further provides a method wherein the antenna comprises a plurality of individual antenna elements, including the step of employing signal phasing means to adjust the relative phase of each of said antenna elements to create the field pattern and to impart counter-rotation to the field pattern.

The second aspect of the invention yet further provides a method including the step of imparting counter-rotation of the field pattern, relative to said satellite, by substantially 360 degrees for each orbit of the satellite.

The second aspect of the invention yet further provides a method for use where the field pattern comprises a plurality of spot beams.

The second aspect of the invention further provides a method for use in telephonic communications with user terminals on the surface of the earth.

The second aspect of the invention yet further provides a method including the step of adjusting the yaw rotation to compensate for the season of the year.

The second aspect of the invention further provides a method including the step of employing the electronic means is to adjust the counter-rotation in sympathy with the adjustment of the yaw rotation for the season of the year.

In a preferred embodiment, a satellite has, for preference, a pair of solar panels on the same or parallel axes, and the antenna comprises separate transmitting and receiving elements. The phasing means comprises, for preference, analog to digital converters and fast fourier transform elements to convert from analog signals to binary digits. where a control element adjusts amplitudes and binary digit timing to create field intensity and phasing for each antenna element, thereafter inverse fast fourier transformation and digital to analog conversion providing a driving signal for each antenna element. In signal receipt, the process is inverted.

Figure 1:
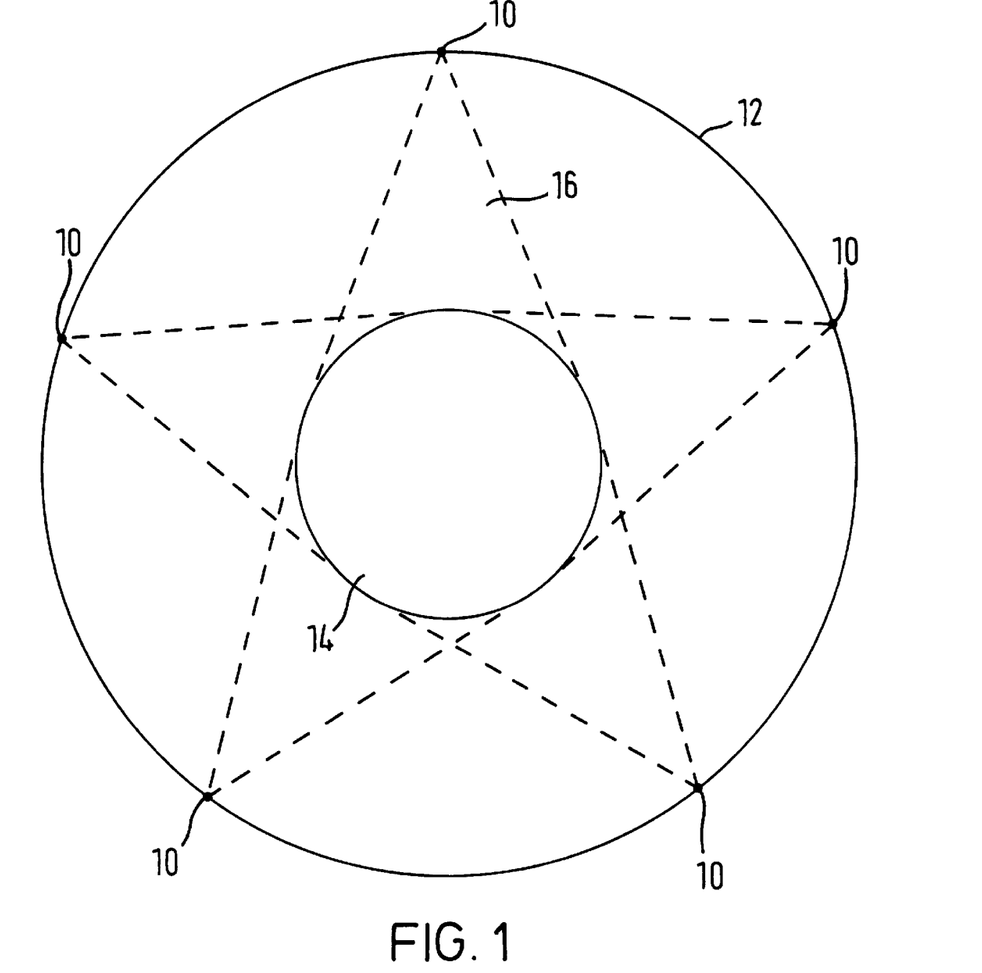
FIG. 1 shows satellites in a preferred orbit about the earth.

The invention is further explained, by way of an example, by the following description, taken in conjunction with the appended drawings, in which:

FIG. 1 shows the disposition of satellites in orbit about the earth.

A plurality of satellites 10 are disposed in an orbit 12 above the surface of the earth 14. Each satellite 10 is provided for the purpose of communications with radio apparatus situated on the surface of the earth 14. To that purpose, each satellite 10 provides a cone 16 of radio coverage with its own portion of the surface of the earth 14. In FIG. 1, the cone of radio coverage 16 is shown as that area where the satellite 10 is more than 10 degrees above the horizon. The satellite 10 are evenly disposed around the orbit 12. In the example given, shown to scale, the satellites 10 orbit at a height of 10 350 km so that five satellites 10 more than cover the circumference of the earth.

Figure 2:
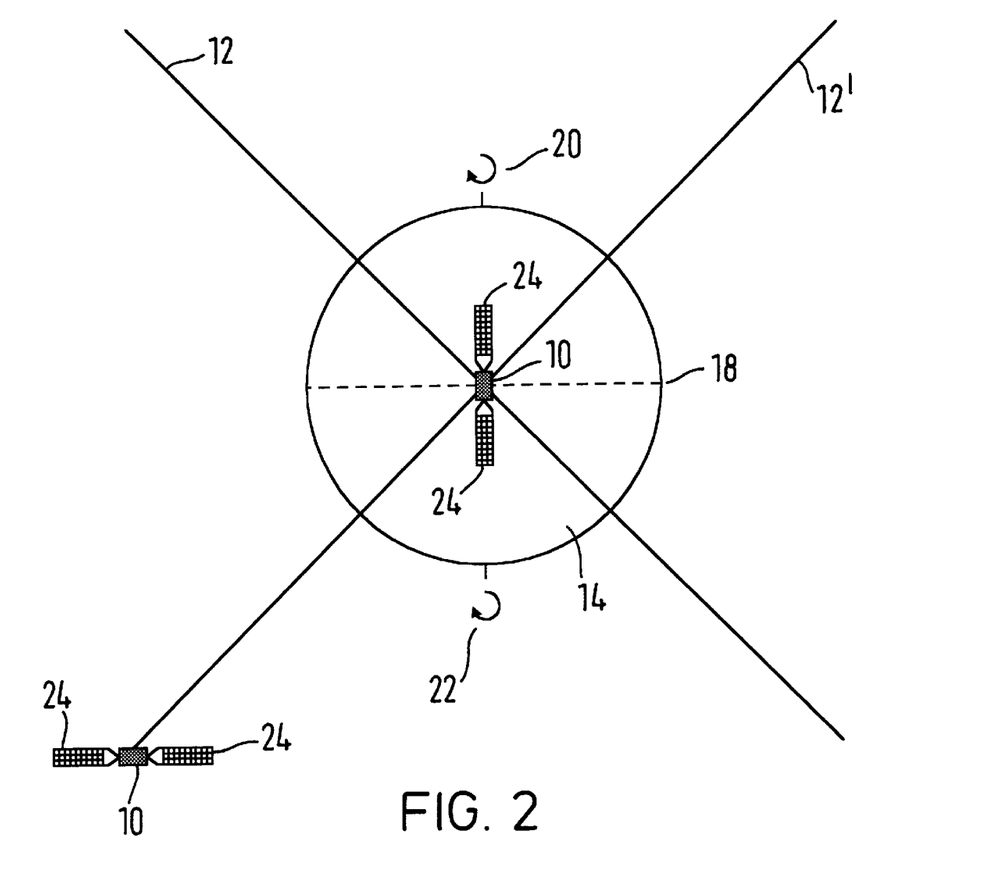
FIG. 2 shows how satellites are disposed in a preferred two orbital planes.

FIG. 2 shows how the satellite 10 are disposed in two orbits.

As well as the orbit 12 shown in FIG. 1, a second orbit 12' is disposed, having the same number of satellites and dispositions as shown in FIG. 1, at 90 degrees to the first orbit 12 so that the planes of the first 12 and second 12' orbits are mutually at 90 degrees. The planes of the first 12 and second 12' orbits are disposed at 45 degrees to the equator 18 so that the line of intersection of the planes of the orbits 12 12' passes through the equator and cuts the axis between the north 20 and south 22 poles at 90 degrees. The satellites 10 each comprise solar panels 24 which, for reasons to be explained here after, are optimally exposed to the sun, imagining the sun to be immediately above the plane of FIG. 2 where the orbits 12 12' cross, in a north and south orientation when the satellite 10 is at the equatorial point in it's orbit and optimally disposed east and west when the satellite 10 is at the extreme of its orbit.

Figure 3:
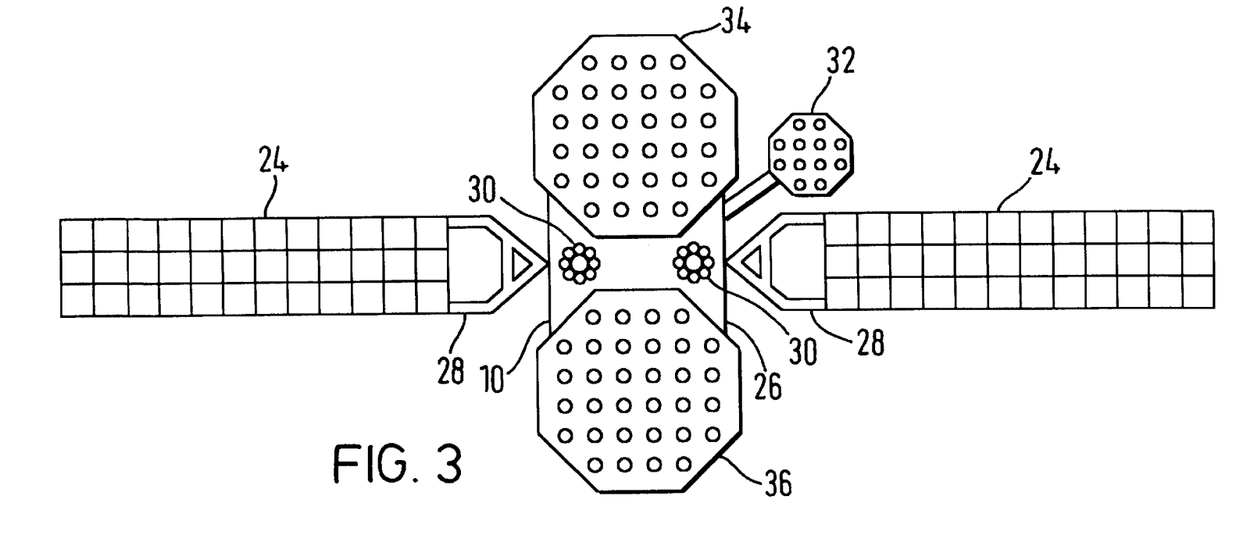
FIG. 3 shows a plan view of a satellite, seen from the surface of the earth.

FIG. 3 is a view, from the surface of the earth 14 showing a satellite 10 in greater detail.

The satellite 10 comprises a body 26 where on the solar panels 24 are mounted by rotating yokes 28. The body 26 of the satellite 10 also supports uplink antennae 30 and downlink antennae 32 whereby the satellite 10 can communicate with an earth station for communication and control purposes. The frequencies of use and the exact function of the uplink antennae 30 and downlink antennae 32 do not form part of the present invention, but are here included for completeness of the description.

In addition, the satellite 10 comprises a transmission antennae array 34 and a reception antenna array 36 whereby the satellite 10 can maintain contact with user terminals, which can be vehicle mounted or resemble cellular telephone handsets, on the surface of the earth 14.

The solar panels 24 are automatically steered to face the sun.

Figure 4:
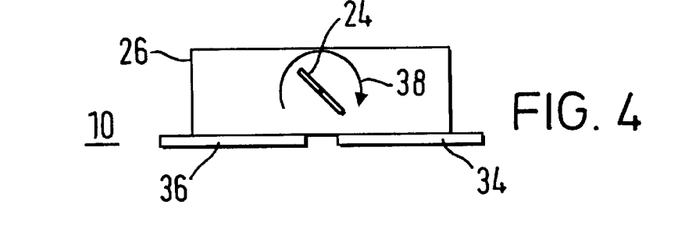
FIG. 4 shows a side elevation of the satellite of FIG. 3.

FIG. 4 shows a sun side view of the satellite 10 otherwise shown in FIG. 3.

The transmission antennae array 34 and the reception antenna array 36 always face the surface of the earth. The solar panels 24 are rotated by the yokes 28, in a manner well known in the art, always to face towards the sun to present the maximum surface area thereto. Rotation is only about the axis indicated by the first arrow 38. There is no provision for rotation in any other axis of the solar panels 24.

Figure 5:
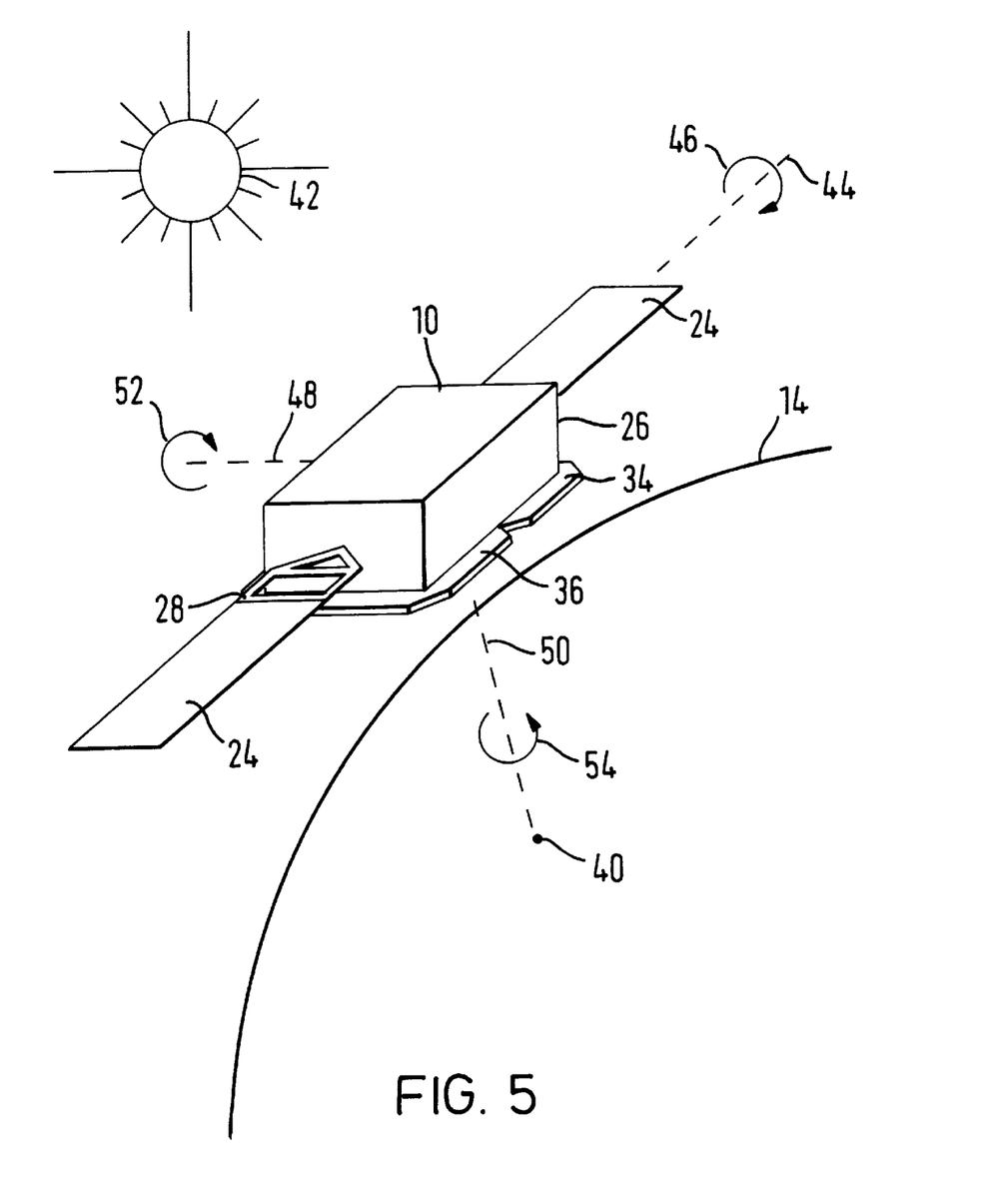
FIG. 5 shows a general view of the satellite in its orbit, and illustrates the various rotations imparted to the satellite.

FIG. 5 is an overall view of the satellite 10 above the surface of the earth 14 indicating the various movements of the satellite 10 in its orbit. The transmission antenna array 34 and the reception antenna array 36 always point directly towards the osition, on the surface of the earth 14, immediately eneath the satellite 10, otherwise known as the nadir 40. The solar panels 24 are rotated by the yoke 28, by means well known in the art, always to point towards the sun 42. A second arrow 44, shown in dotted line, indicates the instant direction of travel of the satellite 10, relative to the surface of the earth 14. Because the satellite 10 always presents the transmission antenna array 34 and the reception antenna array 36 directly pointing to the nadir 40, it is required that the satellite body 26 executes a roll movement about the direction of travel as indicated by the second arrow 44, the roll being indicated by a third arrow 46, so that the transmission antennae array 34 and the reception antennae array 36 are always earth pointed. The roll is executed once in every orbit.

On a second axis 48, at 90 degrees to the direction of travel 44 of the satellite and to the line 50 between the satellite 10 and the nadir 40, a pitching rotation as indicated by a fourth arrow 52, is also imparted to the body of the satellite 26 in order that the transmission antenna array 34 and the reception antennae array 36 may always be pointed towards the nadir 40. The pitching rotation causes the satellite body 26 to execute one full turn of 360 degrees once for every orbit of the satellite 10.

In addition for reasons that will be later explained, a yaw rotation, as indicated by a fifth arrow 54, is also imparted to the satellite body 26 about the line 50 between the satellite 10 and the nadir 40.

Figure 6:
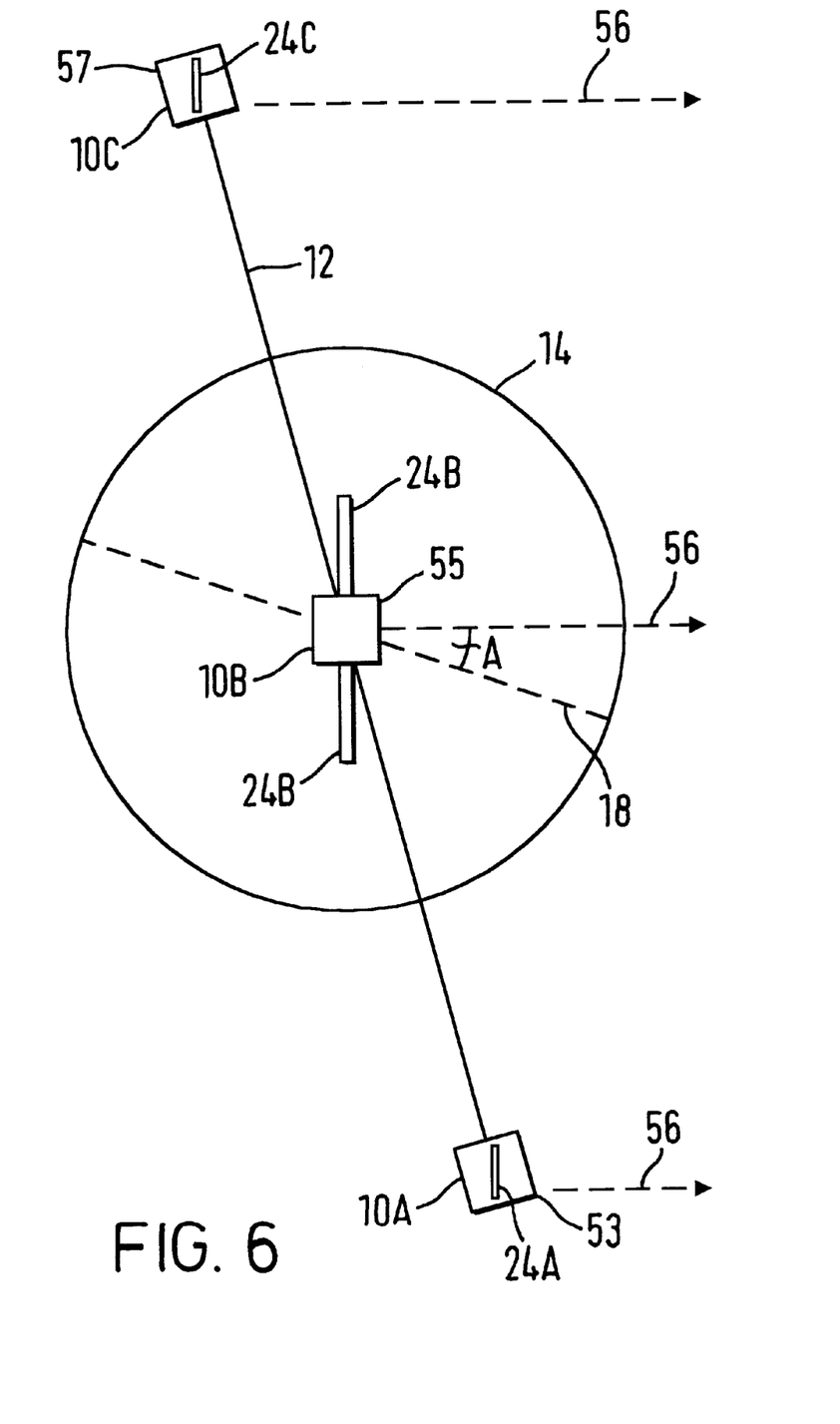
FIG. 6 shows how a yaw rotation of the satellite, described in relation to FIG. 5, presents solar panels for optimal receipt of solar energy, the illustration being for the northern hemisphere summer solstice.

FIG. 6 illustrates the situation of the satellite during the northern hemisphere summer solstice.

Sun lines 56 indicate the direction of the sun 42. All the sun lines 56 are substantially parallel to one another because of the great distance of the sun 42 from the earth 14.

The equator 18 is inclined to the sun lines 56 by an angle equal to 23½ degrees.

At a first point 53 on the orbit 12, inclined to the equator 18 at an angle of 45 degrees, the satellite 10A has its solar panels 24A pointing at 90 degrees to the sun lines 56 with the solar panels 24A pointing directly out from and into the plane of FIG. 6 as viewed. The solar panels 24A have been rotated via the yoke 28 to point directly towards the sun 42.

In a second position 55, above the equator, the satellite 10B has executed a 90 degree pitching movement as indicated by the fourth arrow 52 and has also executed a substantially 90 degree yaw movement, as indicated by the fifth arrow 54, both shown in FIG. 5. The solar panels 24B are once again at 90 degrees to the sun lines 56. As the satellite 10 progresses around the orbit 12, in a third position 57, the satellite 10C has again executed a further 90 degrees yaw and the solar panels 24C are once again presented at 90 degrees to the sun lines 56. In order to achieve the swing from the first position 53 through to the third position 57 it will be observed that the yaw rotation, indicated by the 5th arrow 54 in FIG. 5, has gone through 180 degrees. As the satellite 10 progresses around the second half of the orbit 12, not shown in FIG. 6, the yaw rotation, indicated by the 5th arrow 54 in FIG. 5, executes a further 180 degrees so that by the time the satellite 10A returns to the first position 53, the solar panels 24A are once again ready to point at 90 degrees to the sun lines 56.

Figure 7:
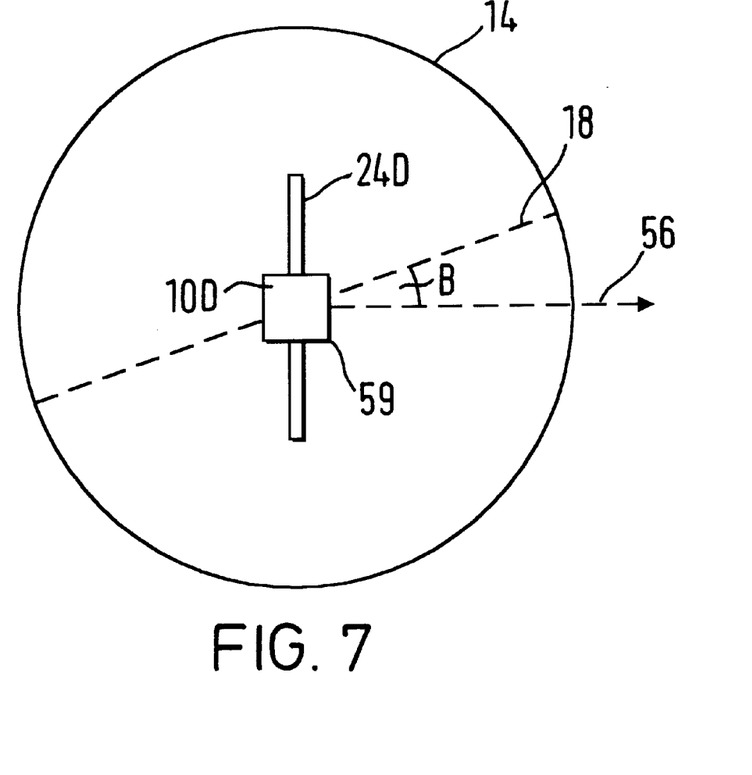
FIG. 7 shows the situation at the northern hemisphere winter solstice.

FIG. 7 shows the situation at the winter solstice where the angle B is now equal to −23½ degrees so that the direction of pointing of the solar panels 24D on the satellite 10D in, effectively, a fourth position 59, over the equator 18, is now different. In other words, there is a slow divergence of the rate of yaw rotation, as indicated by the fifth arrow 54 in FIG. 5, as the year progresses. At the spring and autumn equinox, the solar panels, as shown in FIG. 7, would point directly north south when the satellite 10D is over the equator 18. At other times of year, the angle of the solar panels 24 to the equator 18 shifts between the two extremes shown in FIGS. 6 and 7.

Correction to the rate of yaw rotation can be achieved by in the satellite 10, using reaction motors, well known in the art, or any other means known in the art. Initially the yaw rotation may be started by the use of the same reaction motors. The yaw rotation is substantially 360 degrees per orbit of the satellite, but, as has been explained with reference to FIG. 6 and 7, not precisely so, showing small annual correction.

Figure 8:
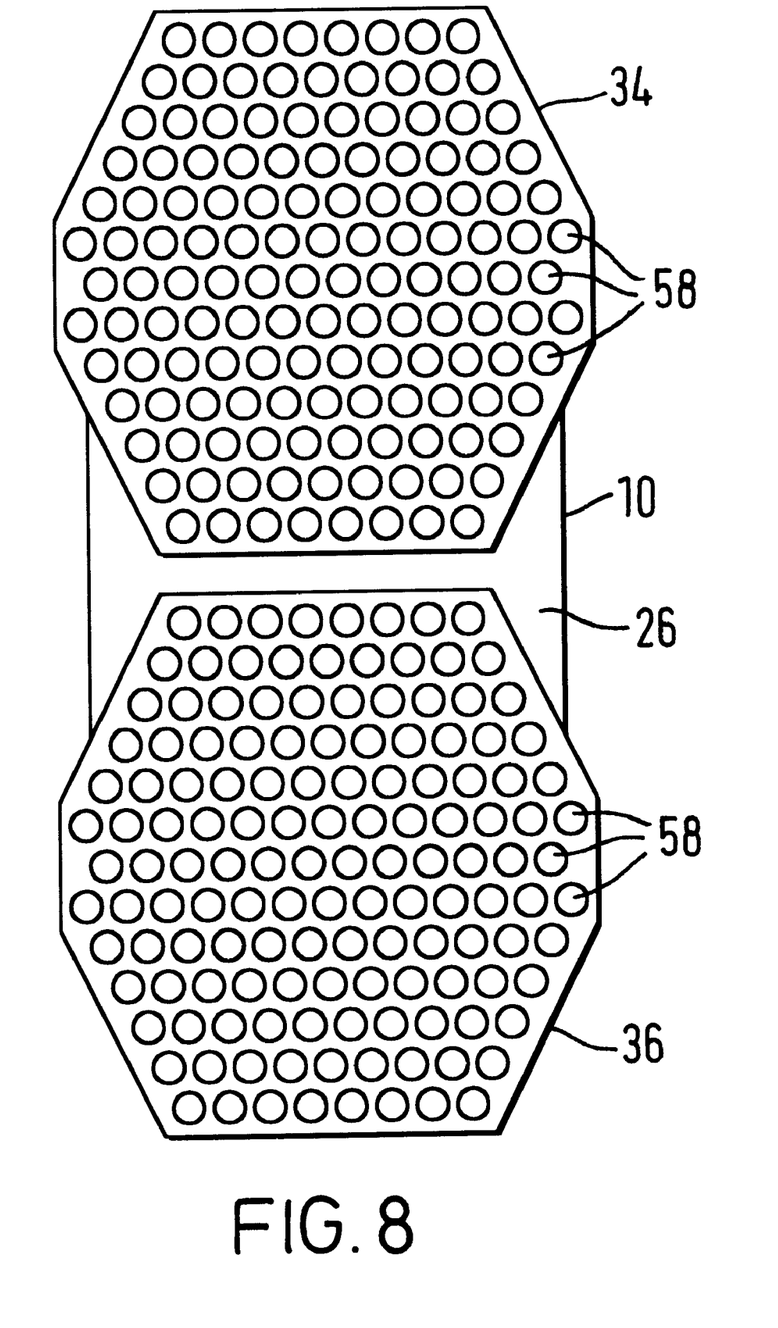
FIG. 8 shows the transmitting and receiving antenna arrays.

FIG. 8 is a view of the transmission antenna array 34 and the reception antenna array 36 of the satellite 10.

Each of the transmission antenna array 34 and the reception antenna array 36 comprise a plurality of individual elements 58. Arranged in a pattern. The elements are individually driven to create a pattern of spot beams, on the surface of the earth, rather like the cells of a cellular phone network, whereby terrestrial users with handsets or other equipment may communicate with the satellite 10.

Figure 9:
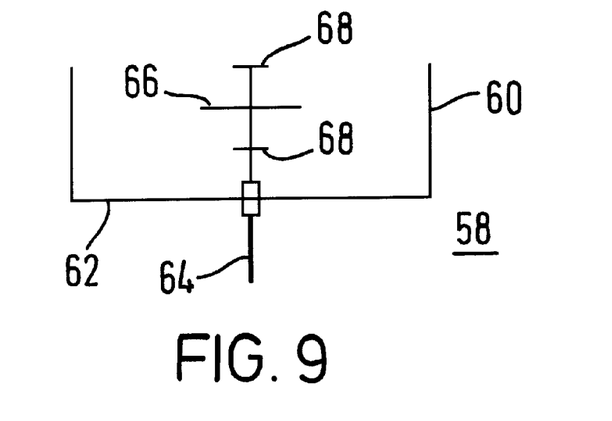
FIG. 9 is a cross-sectional view of an individual antenna element.

FIG. 9 is a cross sectional view of an antenna element 58.

Each antenna element 58 comprises a circular cross section cylinder 60, made of a radio reflective material, and closed at its proximal end to the satellite 10 by an end wall 62. A feed line 64 is connected to a dipole element 66 which is spaced from resonant parasitic elements 68.

Such antenna elements are already known in the art. The antenna element 58 is shown is merely by way of example. All that is required of the present invention is that a type of antenna element 58 exists in any form known in the art and which may be individually driven when forming an array of spot beams.

Figure 10:
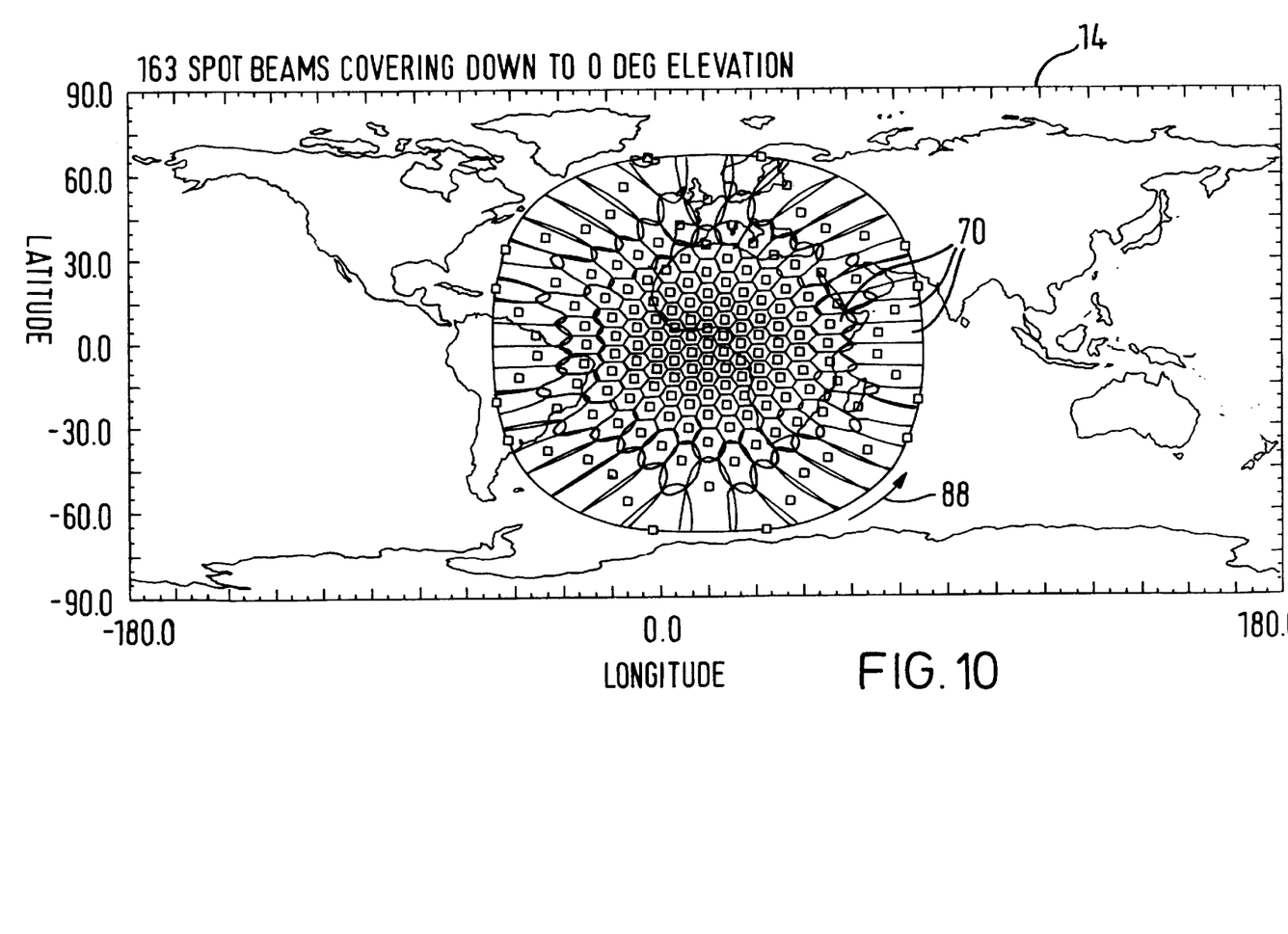
FIG. 10 shows the pattern of beams, thrown on the surface of the earth by the antenna arrays of FIG. 9.

FIG. 10 is a map of the world 14, converted from spherical to rectangular projection, illustrating the pattern of spot beams of the transmission antenna array 34 or under reception antenna array 36 when the nadir 40 of the satellite 10 is located over latitude 0 degrees and longitude 0 degrees.

The antenna elements 58 are individually phase selected and controlled to generate a pattern of 163 spot beams 70 which correspond approximately, to the individual cells in a terrestrial cellular telephone system. Near the nadir 40, the individual spot beams are close together. Because of oblique incidence on the surface of the earth 14, the further from the nadir 40 the spot beam 70 strikes the surface of the earth, the more distorted it becomes. FIG. 10 shows the spot beams 70 down to the cone of radio coverage 16 being tangential to the surface of the earth 14.

It is already known in the art how to generate such a pattern of spot beams 70 using arrays of individually phased antenna elements 58, and it is not a matter for the present invention precisely how the calculation for the phasing of the individual antenna element 58 is made.

Figure 11:
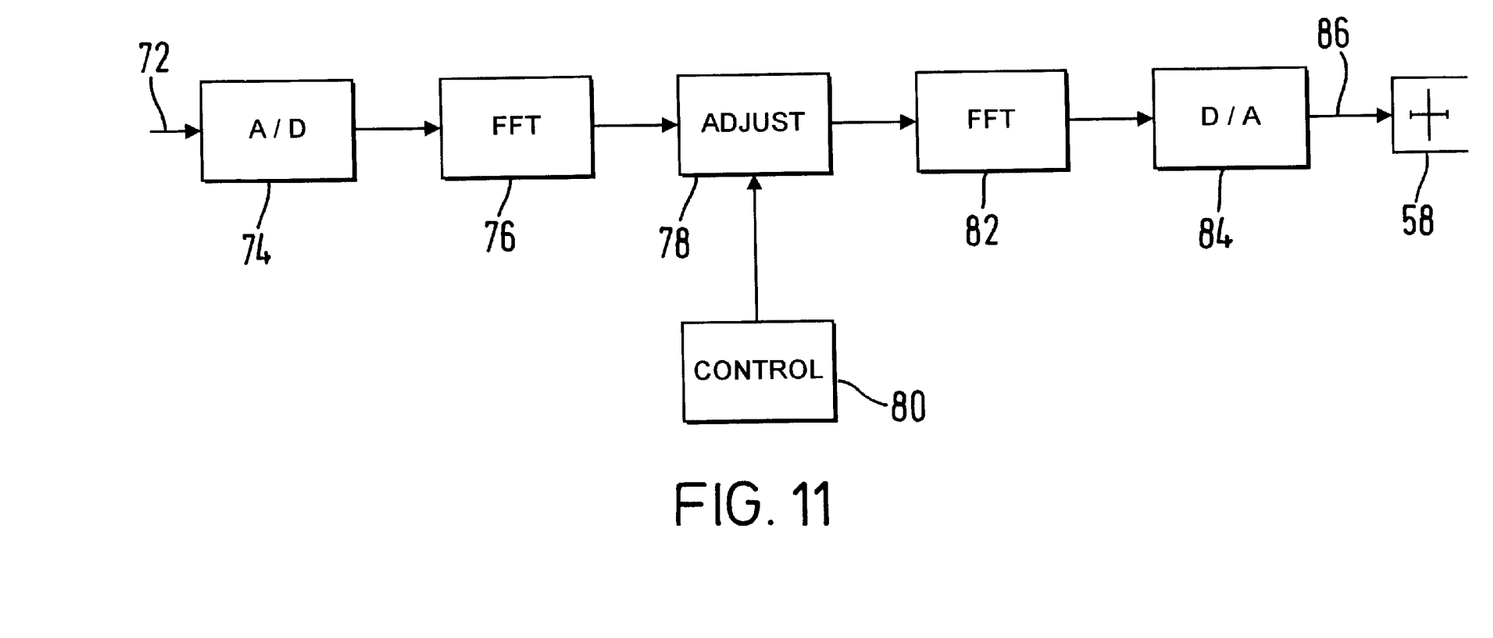
FIG. 11 shows the construction of the preferred phasing means.

FIG. 11 is a block diagram of the manner in which the individual antenna elements 58 may be electronically phased to produce the pattern shown in FIG. 10. It is to be appreciated that the pattern shown in FIG. 10 is merely one of many possible beam patterns for the spot beams 70 for which the present invention is applicable. The beams 70 may be fewer or more in number.

An input feed 72, being signals which are desired to be transmitted, at a first input frequency, are provided to an analog to digital converter 74 which converts the continuously varying input feed 72 into a stream of binary words or binary digits representative of the instant amplitude of the input feed 72 signal.

The output of the analogue to digital converter 74 is provided as input to a first fast fourier transformer 76 which converts the stream of binary digits or binary words into a further stream of binary digits or binary words representative of the frequency spectrum of the analog signal on the input feed 72.

The output of the first fast fourier transformer 76 is provided as input to an adjuster 78 which is controlled by a controlling process over 80. Responding to commands from the controlling process over 80, the adjuster 78 scales the individual binary words to adjust the amplitude of the individual frequency components indicated by the output of the first fast fourier transformer 76 and to adjust the phase thereof by delaying or advancing (relatively) binary words or binary digits.

The output of the adjuster 78 is then fed to a second fast fourier transformer 82 which performs the inverse transformation converting the signal back into a stream of binary digits representative of a signal in the time domain.

The output of the second fast fourier transformer 82 is fed as input to a digital to analog converter 84 which converts a stream of binary digits or binary words into a continuous analog output 86 which is provided as drive to an individual antenna element 58 in the transmission antenna array 34.

Precisely the inverse process occurs for antenna elements 58 in the reception antenna array 36, the controller 80 providing the same adjustment so that the reception pattern reproduces the spot beam 70 array shown in FIG. 10, and copies the beam pattern generated by the transmission antenna array 34.

Returning to FIG. 10 and to FIG. 5, because of the yaw motion of the body 26 of the satellite 10 as indicated by the 5th arrow 54, the spot beam pattern, shown in FIG. 10, tends to rotate, on the surface of the earth 14, as indicated by a sixth arrow 88. This causes the individual spot beams 70 to move, relative to the surface of the earth 14, and causes unnecessary handover of user terminal or individual subscriber handsets between spot beams during the progress of a telephone call.

In order to over come this problem, the controlling processor 80 institutes "electronic deyawing" which will be explained with reference to FIG. 12.

Figure 12:
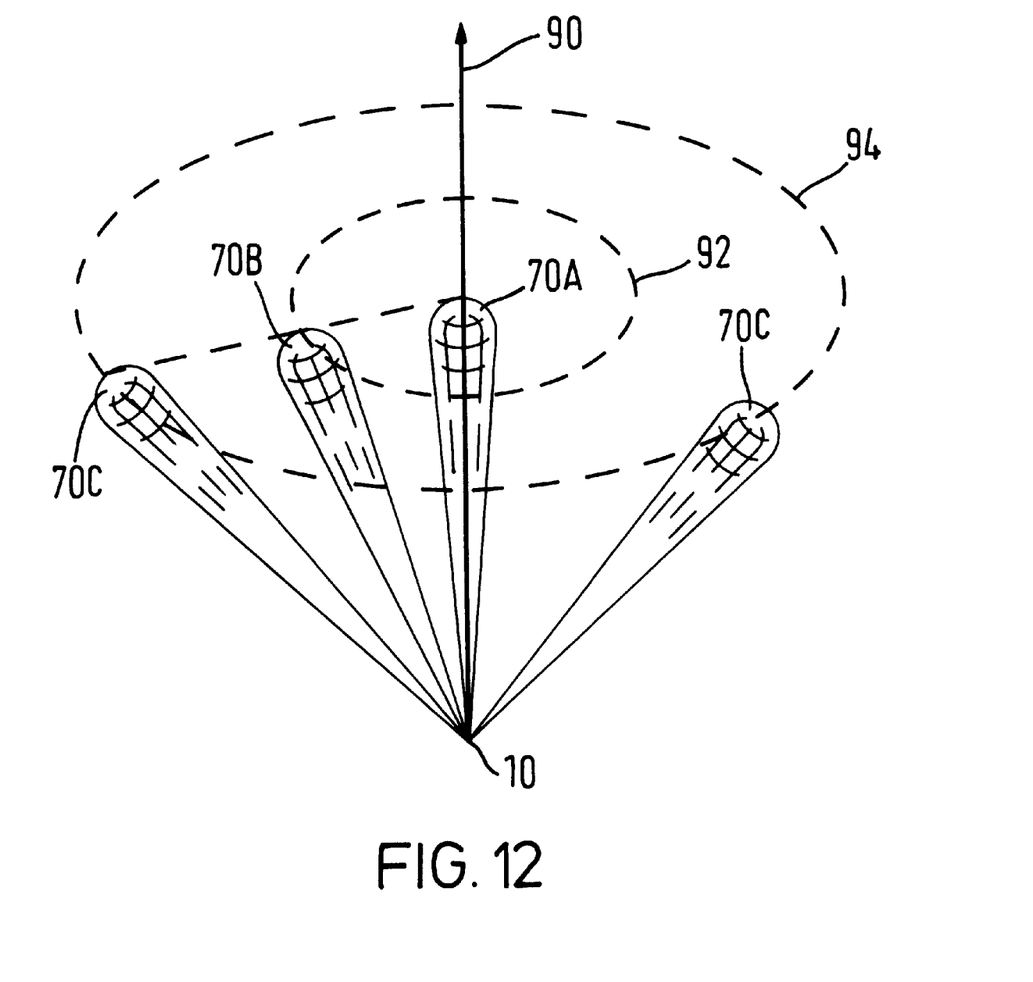
FIG. 12 shows how the individual spot beams, provided by the antenna arrays of FIG. 8 and explained in FIG. 10, are rotated to compensate for the yaw rotation, shown in FIGS. 5 and 6.

FIG. 12 shows how the individual spot beams 70 are rotated, under command from the central controlling processor 80, to compensate for the tendency to rotate, imposed on the spot beam array 70 as a result of the yaw motion, as indicated in FIG. 5 by the 5th arrow 54.

As the body 26 of the satellite 10 rotates, so the spot beams 70 require to be counter rotated to compensate for the yaw motion. The central spot beam 70A, requires no rotation what so ever. No matter what the attitude of the body 26 of the satellite 10, relative to the surface of the earth 14, the central spot beams 70A remains in the same position as indicated by a seventh arrow 90 which points towards the nadir 40.

An intermediate spot beam 70B is caused, by the controlling processor 80, to be displaced from the seventh arrow's direction 90 by an angle corresponding to the angular placement of the intermediate spot beam 70B from the nadir 40, as viewed by the satellite 10. The controlling processor 80, as the satellite 10 describes its orbit 12, causes the intermediate spot beam 70B, in synchronism with passes about the orbit 12, to describe an intermediate circle of rotation 92. Once per orbit, the intermediate spot beams 70B is rotated around the intermediate circle of rotation, centred on the direction of the seventh arrow 90, so that the reverse motion of the intermediate spot beam 70B exactly compensates for all of the yaw motion of the satellite body 10, 26 as it turns about the direction of the line 50 between the satellite 10 and the nadir 40 as the satellite 10 orbits the earth.

Likewise, peripheral spot beams 70C, on the very edge of the array of spot beams as shown in FIG. 10, are displaced by a greater angle than the intermediate spot beam 70B and rotated, in just the same manner, to describe an outer circle of rotation 94.

While, in FIG. 12, only a few spot beams 70 have been shown, it is to be understood that the entire array of beams, as shown in FIG. 10, are individually similarly rotated under control from the controlling processor 80.

The controlling processor 80 may make its own calculations regarding the placing of the spot beams 70 to compensate for the yaw rotation 54. Equally, the controlling processor 80 may receive instructions from a ground station to make the necessary antenna array beam pattern compensation.

By use of these measures, a method and satellite system are provided where optimal use of solar panels 24 to power the satellite 10 is achieved with minimal orientation requirements for the solar panels, thus reducing the weight and complexity of the satellite 10 while improving reliability thereof, at the same time providing an antenna beam pattern consistent with the efficient use of spot beams, stable upon the surface of the earth 14.

Those skilled in the art will be aware that the attitude of the satellite 10 and its body 26 may be corrected using reaction motors, thrusters, and any other means known in the art. Those skilled in the art will also be aware that the present invention encompasses orbits of any altitude and with any period. Those skilled in the art will also be aware that the present invention is applicable to orbital planes other than those shown in the specific example of the preferred embodiment of the invention.

I claim:

1. A satellite to be used in orbit about the earth, comprising:

an antenna to project a field pattern onto a surface of the earth;

a solar panel mounted and configured to rotate about a first axis;

a satellite controller to control pitch and roll of the satellite to maintain the antenna directed towards the satellite's nadir and to yaw the satellite about a second axis substantially perpendicular to the first axis passing through the antenna and through the nadir so as to configure the first axis substantially perpendicular to a line passing through the satellite and the sun and a processor to impart a counter-rotation to the field pattern to counteract the yaw.

2. A satellite, according to claim 1, wherein said antenna comprises a plurality of individual antenna elements and said processor comprises a signal phasing circuit operable to adjust the relative phase of each of said antenna elements to create said field pattern and to impart said counter-rotation to said field pattern.

3. A satellite, according to claim 1, wherein said counter-rotation of said field pattern comprises rotating said field pattern, relative to said satellite, by substantially 360 degrees for each orbit of said satellite.

4. A satellite, according to claim 1, wherein said field pattern comprises a plurality of spot beams.

5. A satellite, according to claim 1, for communication with a user terminal on the surface of the earth.

6. A satellite, according to claim 1, wherein the satellite controller is configured to adjust said yaw to compensate for the season of the year.

7. A satellite according to claim 6, wherein said processor is operative to adjust said counter-rotation in sympathy with said adjustment of said yaw for the season of the year.

8. A method of operating a satellite in an orbit about the earth, comprising:

projecting a field pattern onto a surface of the earth;

controlling pitch and roll of the satellite to maintain direction of the center of the field pattern substantially at the nadir of the satellite;

rotating the satellite about the axis passing through the satellite and the nadir so as to allow alignment of a solar panel normally to the sun and electronically rotating the field pattern so as to impart a counter rotation so as to compensate for a yaw of the satellite rotation.

9. A method, according to claim 8, for use when said antenna comprises a plurality of individual antenna elements, said method including employing signal phasing circuits to adjust the relative phase of each of said antenna elements to create said field pattern and to impart a counter-rotation to said field pattern.

10. A method according to claim 9, further comprising sending a control signal from an earth-bound station to the satellite to impart said counter-rotation.

11. A method according to claim 8, wherein said counter-rotation of said field pattern comprises rotating said field pattern, relative to said satellite, by substantially 360 degrees for each orbit of said satellite.

12. A method, according to claim 8 for use when said field pattern comprises a plurality of spot beams.

13. A method, according to claim 8, for use in telephonic communications with user terminals on the surface of the earth.

14. A method, according to claim 8, including adjusting said yaw to compensate for the season of the year.

15. A method, according to claim 14, including employing a processor to adjust said counter-rotation in coordination with said adjustment of said yaw for the season of the year.

16. A satellite comprising:

an antenna to project a field pattern;

a satellite controller configured to rotate the satellite about three orthogonal axes of rotation;

a solar panel to generate electricity to power the satellite;

a solar panel controller configured to rotate the solar panel about one axis of rotation in which the solar panel controller and the satellite controller are configured together to decouple rotation of the solar panel from rotation of the satellite; and a processor to decouple rotation of a field pattern from rotation of the satellite in one of the three orthogonal axes of rotation.

17. A satellite system comprising a satellite in orbit around the earth, said satellite maintaining a first face directed towards its nadir by controlling pitch and roll, said satellite comprising a solar panel operable to rotate about an axis to face the sun, the satellite configured to execute a yaw rotation about the direction between said satellite and said nadir as said satellite executes said orbit, wherein said yaw rotation presents said axis at ninety degrees to the direction between said satellite and the sun thereby enabling said solar panel to obtain maximum exposure to the sun, said first face comprising a communications antenna for providing a predetermined field pattern on a surface of the earth and a processor for imparting a counter-rotation to said field pattern about said direction between said satellite and said nadir to counteract the movement of said field pattern resulting from said yaw rotation.

* * * * *